Oct. 4, 1960 R. COLOMBO 2,954,581
APPARATUS FOR MANUFACTURING HOLLOW ARTICLES
Filed Dec. 27, 1956 2 Sheets-Sheet 1
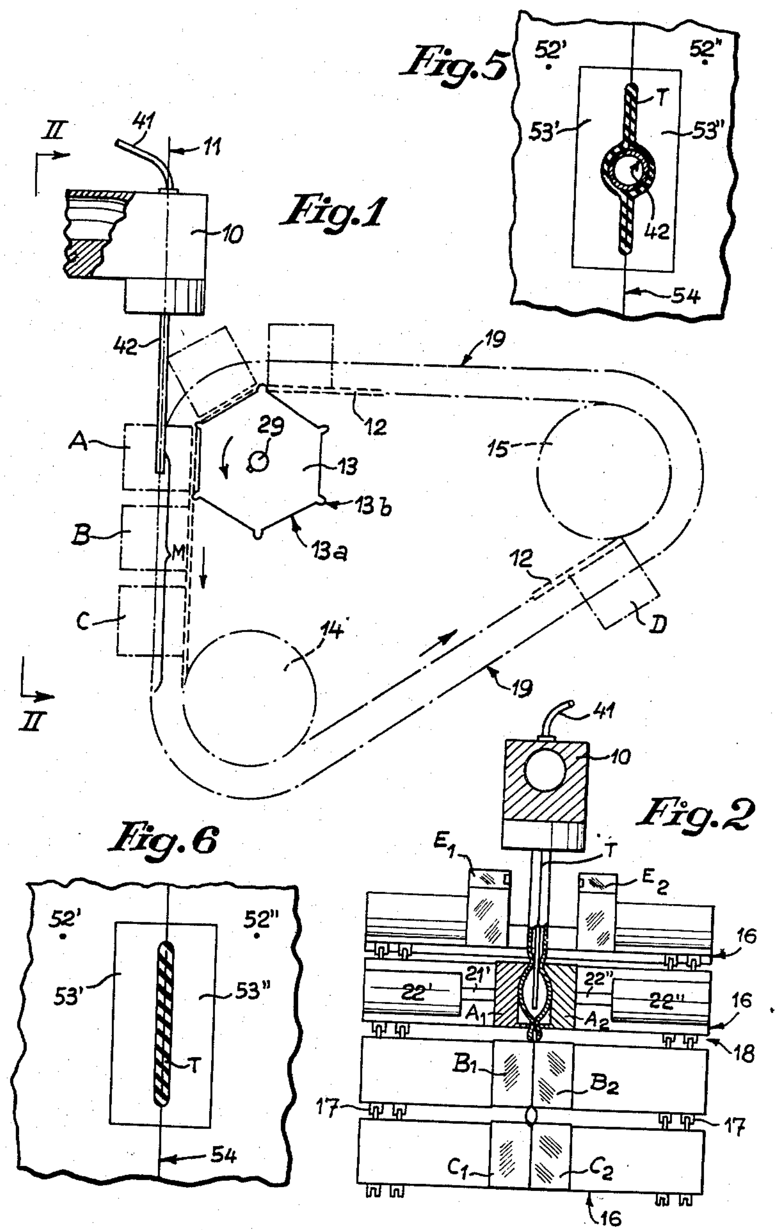

Oct. 4, 1960 R. COLOMBO 2,954,581
APPARATUS FOR MANUFACTURING HOLLOW ARTICLES
Filed Dec. 27, 1956
2 Sheets-Sheet 2
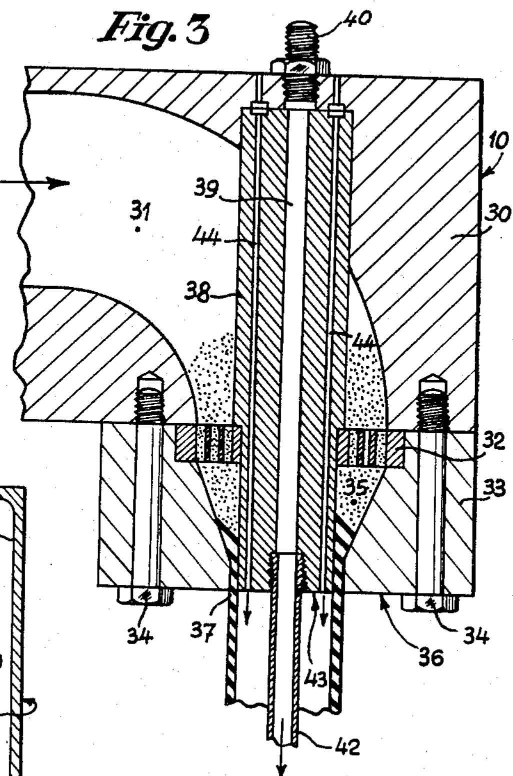
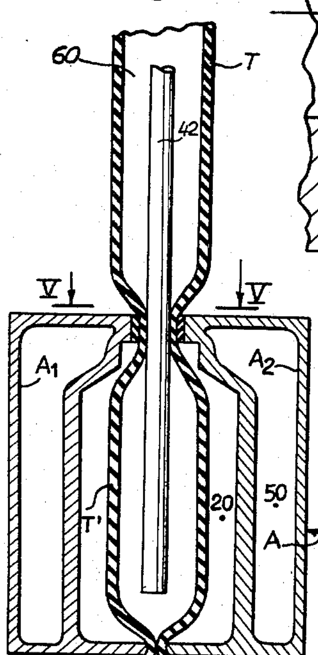
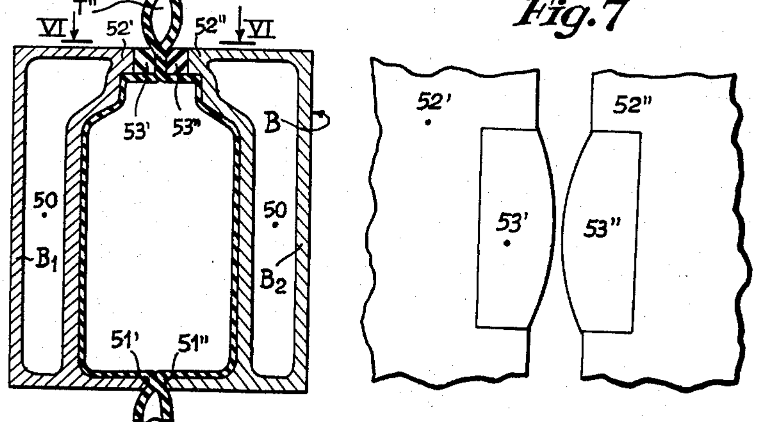

United States Patent Office 2,954,581 Patented Oct. 4, 1960

2,954,581

APPARATUS FOR MANUFACTURING HOLLOW ARTICLES

Roberto Colombo, Turin, Italy, assignor to S.A.S. Lavorazione Materie Plastiche (L.M.P.) di M. I. Colombo & C., Turin, Italy Filed Dec. 27, 1956, Ser. No. 630,950

4 Claims. (Cl. 18—5)

This invention relates to the manufacture of hollow article from a thermoplastic material, such as polyethylene or the like.

More particularly, this invention relates to the manufacture of such articles through extrusion of the thermoplast to tube form and expansion of successive portions of said tube by means of a pressure fluid in a plurality of molds capable of being opened, said molds travelling continuously along a path which is superposed in part on the path of the tube issuing from the extrusion head.

Since known methods and apparatus have not succeeded in affording a continuous manufacture of high efficiency in respect both of power and material employed, the main purpose of this invention is to provide a method and apparatus eliminating the drawbacks of present technique.

According to this invention, an apparatus for manufacturing hollow articles from thermoplast by extrusion of a softened tube of said material and expansion by means of a pressure fluid of successive portions of the said tube in a plurality of sectional moulds which travel continuously over a path superimposed in part on the path of the extruded tube issuing from the extrusion nozzle, is characterised by the fact that the thermoplast tube is extruded about a fluid blower tube projecting from the nozzle over a substantial length, the said thermoplast tube being larger in bore than the outer diameter of the blower tube; successive adjacent portions of the said thermoplast tube are successively insulated from one another in the said moulds by clamping the thermoplast tube simultaneously at a point beyond the free end of the blower tube and intermediate the length of the blower tube, clamping at the latter point being effected in a resilient manner; the expansion fluid is blown into the insulated portion through the blower tube as the insulated portion is moved towards the free end of the blower tube by causing it to slide on the latter by its resiliently clamped end till it leaves the said free end of the blower tube; finally, movement of the mould containing the insulated portion is pursued out of engagement with the blower tube as the ends of the insulated portion are kept tightly clamped against escape of the expansion fluid to the moment of stripping the article out of the mould.

Further details of the method and an apparatus for carrying it out will be understood from the appended description which refers to the accompanying drawing given by way of a non-limiting example, wherein:

Figure 1 is a diagrammatic view of the apparatus;

Figure 2 is a view in the direction of the arrows II—II of Figure 1;

Figure 3 is an axial cross-section of the extrusion head associated with the apparatus shown in Figures 1 and 2;

Figure 4 is a downward extension of Figure 3 showing in an axial cross-sectional view two successive moulds during one special step of the process;

Figures 5 and 6 are views on lines V—V and VI—VI, respectively, of Figure 4;

Figure 7 is a view similar to Figures 5 and 6 of a mould in a half-closed condition.

Referring to Figures 1 and 2, an extrusion press for thermoplastic material, such as polyethylene or polyamide resins, comprises an extrusion head 10 adapted to extrude a softened tube T of the said material vertically downwardly over a path, of which the upward extension is visible at 11. Four sectional moulds A, B, C, D out of a plurality of moulds are shown supported by an endless conveyer chain 12 travelling continuously over sprocket wheels 13, 14, 15. The chain 12 comprises a set of rectangular supporting plates 16, successively hinged to one another by means of hinges 17 arranged on the big sides of the rectangles. The sprocket wheel 13 is of hexagonal contour, each side 13*a* equalling in length the small side of plate 16, so that teeth 13*b* of the sprocket chain 13 can engage slits 18 between the individual chain plates and displace the latter in the direction shown by the arrows in Figure 1. The shaft 29 of the sprocket wheel 13 is connected in a manner known per se with an adjustable speed motor, not shown. It is understood that the sprocket wheels 13, 14 and 15 shown in Figure 1 are each associated with a further similar wheel, not shown on the drawing, to form wheel pairs. Chain conveyers of the abovementioned type are generally known and need therefore not be further described.

During movement of the chain 12, the moulds A, B, C, D . . . move over an endless path 19 superimposed on the path 11 of the tube T at the region indicated by the bracket M. The length of this superimposition is immaterial in respect of the purposes of this invention. At the limit the said region might be reduced to a mere point of tangency or intersection. The essential point is that each mould should at a given moment be aligned with the axis of the tube T in order to insulate out of the latter a longitudinal portion, as described hereafter.

In Figure 1, the moulds A, B, C are shown in their aligned position, the mould D being shown in a position in which the manufactured article is expelled from the mould.

Each mould A, B, C . . . comprises two halves A1, A2; B1, B2; C1, C2; etc. defining together a moulding cavity 20 (Figure 4) and slidably mounted on their respective plate 16 in the longitudinal direction of the said plate, that is, perpendicular to the direction of travel of the mould. The mould half A1 is secured to the end of the rod 21′ of the piston of a hydraulic ram 22, the mould half A2 being secured to the end of the rod 21″ of the piston of a similar ram 22″, the said two rams being solidly secured to the opposite end portions of the plate 16. The rams are of the double-acting type so that, on supply thereto of a suitable pressure fluid, the mould halves A1, A2; B1, B2 etc. can be drawn apart (see E1, E2 in Fig. 2) or drawn together under pressure. The rams 22′, 22″ constitute therefore means for opening and closing the moulds, independently of a special pressure fluid supply and delivery arrangement which may be of any suitable construction as taught by the art.

The extrusion head 10 (Figure 3) comprises a portion 30 securedly fixed to the press supplying the softened thermoplast, the said portion 30 being formed with a tubular passage 31 curved to open vertically downwardly. At the orifice of the passage 31 a grid 32 is clamped to the portion 30 by a member 33 and bolts 34. The member 33 is formed with a conical aperture 35 connecting at one end with the passage 31 and opening at its other end on the lower face 36 of the member 33 vertically downwardly. A core 38 is mounted in the head 10 on the axis of the aperture 35 and is of cylindrical cross sectional shape. The lower end of the core 38 is flush with the plate 36 and defines together with the member 33 an annular extrusion passage 37. The core 38 is axially bored throughout at 39, the bore 39 communicating at the top with a fitting 40 which can be connected through a conduit 41 (Fig. 1) with compressed air supply means, not shown on the drawing. A blower tube 42 is screwed according to an essential feature of this invention to the lower end of the bore 39 and extends downwardly beyond the annular passage 37 in the direction of extrusion over a substantial length to the region M (Figure 1) at which the paths 11 and 19 are superimposed. The outer diameter of the blower tube 42 is substantially smaller than the bore of the annular passage 37, whereby the extruded pipe T of thermoplast freely travels downwardly without contacting the blower tube 42, a radial annular region 43 being left free on the lower front face of the core 38. Passages 44 open at the said region 43, the said passages extending through the core 38 throughout its length and freely connecting at the top with the surrounding air. The outer surface of the blower tube 42 is fully smooth and preferably provided with a specular finish.

The mould halves A1, A2; B1, B2, etc. in addition to defining together a moulding cavity 20 (Figure 4) are each provided in a manner known per se with a cooling jacket 50 fed with water through any known means. The cavity 20 is confined at the bottom by clamping jaws 51′, 51″, associated with the two cooperating mould halves, respectively and adapted to flatten and tightly clamp a region of the extruded tube T when the two mould halves are closed in alignment with the tube T. The mould halves are provided at the top with clamping jaws 52′, 52″, respectively which, as distinct from the jaws 51′, 51″ clamp the tube T instead of directly through the interposition of pads 53′, 53″ of a resilient material, such as rubber. The pads can be separately and interchangeably attached or each of them can be vulcanised to its respective mould half. When a mould is closed empty, the resilient pads come into contact with each other along the line separating the mould halves, the said line extending for instance as at 54 in Figures 5 and 6. The pads extend over the said separating line a length at least equalling the outer diameter of the blower tube, but preferably greater than half the circumference of the tube T, so that the latter is clamped exclusively by the said pads.

The method according to this invention shall now be described in greater detail with reference to the above described apparatus.

Assuming the chain to be in motion, starting from the stripping station D the moulds approach in an open condition the extrusion head 10 (Fig. 1). As a mould reaches the region M at which the paths 11 and 19 are superposed, in the position in which the lower jaws 51′, 51″ are just beneath the lower end of the blower tube 42, the rams 22′ and 22″ close the moulds. This condition is shown in Figure 4 in connection with the mould A. While the lower jaws of the mould halves A1, A2 directly clamp the tube T, just beneath the tube 42, the top jaws clamp the tube T by means of the resilient pads 53′, 53″. This condition is shown in Figure 5, from which it will be seen that a cross-sectional portion of the tube T is resiliently clamped about the blower tube 42, other tube portions being clamped one against another by the same resilient pads. Considering the tube T in its softened condition, closure of the mould A will insulate air-tightly a portion T′ of the tube T. On further downward movement of the mould A, compressed air is blown through the blower tube 42 to cause the insulated portion T′ to expand into the cavity 20, whereby the portion T′ matches the profile of the said cavity. The compressed air expanding from tube 42 cools the latter, so that the portion of the tube T clamped about the tube 42 slides downwardly on the latter together with the mould A without the thermoplastic material sticking to the tube 42. The specular outer surface of the tube 42 facilitates this air-tight sliding movement. The mould motion is synchronised with the extrusion rate of the tube T from the head 10, so that the tube portion between the mould A and head 10 is not subject to any forces other than its own weight.

It should be noted that, since the tube 42 is much thinner than the tube T, a chamber 60 increasing in volume is formed between the two on extrusion. In the absence of air passages 44 through the core 38 (Figure 3), the tube T would therefore be automatically flattened over the length between the head and mould engaged with the blower tube 42. This occurrence, which is not very detrimental with for instance polyethylene resins, would be destructive when extruding polyamide resins which are highly fluid at the extrusion temperature and should always be extruded in an accurately vertical downward direction avoiding any possible disturbance. The passages 44 admit access of free air to the chamber 60, thereby balancing the outer pressure, so that the apparatus is fully satisfactory in treatment of polyamide resins.

When the mould A leaves the blower tube 42, the rubber pads 53′, 53″ further clamp the thermoplast tube T, as shown in Figure 6, the mould taking the position of the mould B in Figure 4, its place being readily taken by a fresh mould adapted to insulate and expand a further portion of the tube T in the above described manner. In the meantime the material in the mould (B) which has just left the blower tube, is subjected to the pressure of the expansion air, the mould being cooled by an active circulation of water through the cooling jackets 50. It is not easy for the resilient pads 53′, 53″ to maintain unaltered the initial inner pressure as the closed mould is moved from the position A to the position D (Figure 1) in which it is opened to expel the hardened article, unless certain precautions are taken. Firstly, the blower tube 42 is advantageously made of the smallest possible outer diameter consistent with the air volume to be blown and the time available for blowing. Generally, a diameter of 3–5 millimeters with a wall thickness of the tube 42 of about 0, 3 millimeters should be sufficient. Under these conditions, the tube 42 is satisfactorily cooled through the expansion of the compressed air, objectionable excessive deformation of the resilient pads on clamping the tube being avoided. The tube 42 is of heat conductive material, generally steel. It is further advantageous to make the pads 53′, 53″ of convex shape, as shown in Figure 7 of the drawing, in order to increase their clamping pressure at their middle portion which is the one encircling the tube 42 and, successively, further clamping the thermoplast T on removal from the blower tube 42. Finally, starting from the position A (Figure 1) to the stripping station D the moulds are advantageously efficiently cooled in order to cause the moulded article to stiffen as readily as possible. With these precautions clamping by the resilient pads 53′, 53″ is in any case sufficient to prevent a considerable fall in pressure within the closed mould, hence an accidental removal of the material from the walls of the cavity 20 before ultimate setting and stripping.

Since the moulds are cooled the resilient pads, for instance made of rubber, are not as a rule appreciably heated in contact with the just extruded tube T; a deterioration of the pads need therefore not be feared. However, in order to prevent such a risk as well as a possible sticking of the pads to the tube T at the clamping region, the resilient pads are advantageously made of silicone rubber.

Summarising, the method according to this invention comprises the following working steps: a thermoplast tube T is extruded about a fluid blower tube 42 extending downwardly from the nozzle 37 a substantial length, the said thermoplast tube T being larger in bore than the outer diameter of the tube 42; adjacent portions T′ of the said thermoplast tube are successively insulated in sectional moulds A, B, C . . . , simultaneously clamping the tube T at a point situated beneath the free end of the blower tube 42 by means of jaws 51′, 51″ and at a point intermediate the length of the tube 42 by means of jaws 52′, 52″, clamping at the latter point being resiliently effected (by means of pads 53′, 53″); expansion fluid is blown into the insulated portion T′ through the tube 42 as the insulated portion T′ is moved towards the lower end of the tube 42 by causing it to slide over the latter by its resiliently clamped end till it leaves the said end of the blower tube 42; the movement of the mould enclosing the insulated portion T′ is pursued out of engagement with the tube 42 as the ends of the portion T′ are held tightly clamped against the expansion fluid till stripping is effected at D.

The expansion fluid (compressed air) can be blown through the tube 42 intermittently or continuously. In the former case an air distributor can be arranged ahead of the conduit 41 (Figure 1), the said distributor being synchronised in a manner known per se with the mould closing movement at the station A, so that blowing of air starts promptly on closure of the mould and ends before the mould leaves the tube 42. In the latter case compressed air issues from the tube 42 even when the mould is removed from its lower end, so that a portion T″ (Figure 4) of the tube T right above the pads 53′, 53″ might even burst or at least be perforated by the compressed air jet. Even should this occurrence not be detrimental per set, the portion T″ not being utilised in the working cycle, the apparatus according to this invention avoids it with almost absolute safety through the provision of passages 44 in the core 38, through which air issuing from the tube 42 can escape towards the outside at the moment preceding closure on the tube T of the next mould.

As compared with the state of the art, the advantages of the method and apparatus according to this invention will be obvious to those skilled in the art. Firstly, the invention fully eliminates individual pneumatic circuits for each mould, that is, the successive insulated portions of the tube T are expanded and maintained under pressure merely by means of one blower tube 42 and two resilient pads 53′, 53″ with a continuous high-speed operation, which is merely dependent upon the rate at which the thermoplast T is extruded. Secondly, as compared with arrangements in which the moulds are clamped over a continuously extruded tube, according to this invention the moulds can be closed right below the extrusion nozzle 37, so that the tubular portion just extruded by the nozzle never reaches a weight capable of breaking it. This is essential in the treatment of polyamide resins which, on account of their high fluidity at the extrusion temperature, could be worked by discontinuous processes only, in which extrusion was directly effected into the mould and had to be interrupted during replacement of the moulds. Finally, continuous blowing through the tube 42 dispenses with any compressed air distributing arrangement, as all that is necessary to do is to connect the supply pipe 41 with a compressor or other source of expansion fluid without the interposition of synchronised delivery valves or the like.

It will be obvious that instead of the chain 12 supporting the moulds a rotating table can be employed in a known manner, the said table carrying a plurality of sectional peripheral moulds. Similarly, the extrusion head shown in Figure 3 by way of example could be replaced by an equivalent construction, supplied, if desired, from two or more presses with material differing in colour and provided with heating means. It is not essential for the free air passages 44 to extend throughout the length of the core 38. The said passage might extend from core face 43 to the level of the grid 32, then radially through the latter and member 33 to the outside. Spacing of the moulds along the chain or other rotatable or travelling support is merely dependent upon considerations of a structural mechanical nature so that, by conveniently designing the hinges between the individual supporting plates, the moulds can be adjacent one another, thereby fully eliminating the non-utilised portions T″ of the thermoplast tube T. When alignment of the moulds with the tube T and closing thereof right below the extrusion head 10 is desired, as convenient in the treatment of polyamide resins, the extrusion head is arranged within the vertical descending section of the path mould 19, the mould opening width being larger than the head width so that, in operation, the mould halves can pass clear on both opposite sides of the head and close right beneath the extrusion nozzle 37. The tube 42 is then fully contained at the superimposed region of paths 11, 19 and is made shorter in length than the axial dimension of the individual moulds so that, when the mould closes right below the nozzle 37, the lower end of the blower tube 42 is within the cavity 20.

In certain cases it may be essential to prevent the blower tube 42 from becoming unduly hot during operation. This tube can then be made up of co-axial tubular elements, leaving gaps therebetween. The gaps are then in communication with suitable inlet and outlet passages bored in the core 38, the said passages being connected with a cooling water circulation. This arrangement prevents the softened thermoplast from sticking to the tube 42 at the pads 53′, 53″.

Further modifications can be made without departing from the scope of this invention as defined by the appended claims.

What I claim is:

1. In an extrusion apparatus for manufacturing blown hollow articles having a downwardly directed annular extrusion nozzle capable of extruding a tubular blank of softened thermoplastic material, a thin walled blowing tube of a heat conductive material depending from the nozzle on the longitudinal vertical axis thereof, a sectional mold capable in its closed condition of clamping and sealing the tubular blank in a zone below the lower end of the blowing tube and of clamping a zone of the tubular blank on the blowing tube, and means for displacing the mold in closed condition lengthwise of the blowing tube and beyond the lower end of the latter, the said blowing tube composed of a thin walled heat conductive material having a diameter substantially smaller than the diameter of the annular nozzle, whereby the blank being extruded from the nozzle will coaxially surround the blowing tube out of contact therewith, and means for clamping a zone of the tubular blank on the blowing tube comprising a pair of cooperating clamping jaws on the mold and a pad of resilient material on each jaw resiliently engaging and clamping the last named zone of the tubular blank, the pads being capable of completely collapsing therebetween the said last named zone of the tubular blank in the absence of the blowing tube in the zone.

2. In apparatus as claimed in claim 1, said pads consisting of a silicone rubber material.

3. In apparatus as claimed in claim 1, said pads extending along the separating line between the mold sections through a length greater than half the circumference of the extrusion nozzle.

4. In apparatus as claimed in claim 1, the blowing tube of steel having a diameter of three to five millimeters and a wall thickness of about 0.3 millimeters.

References Cited in the file of this patent

UNITED STATES PATENTS

| | | |
|---|---|---|
| 2,708,772 | Moncrieff | May 24, 1955 |
| 2,844,846 | Kronholm | July 29, 1958 |
| 2,861,295 | Hagen et al. | Nov. 25, 1958 |

FOREIGN PATENTS

| | | |
|---|---|---|
| 61,855 | France | Dec. 8, 1954 |
| 1,030,004 | France | Mar. 11, 1953 |